United States Patent [19]
Waldman

[11] Patent Number: 5,402,481
[45] Date of Patent: * Mar. 28, 1995

[54] ABBREVIATED AND ENHANCED DIALING APPARATUS AND METHODS PARTICULARLY ADAPTED CELLULAR OR OTHER TYPES OF TELEPHONE SYSTEMS

[76] Inventor: Herbert Waldman, 1739 - 52 St., Brooklyn, N.Y. 11204

[*] Notice: The portion of the term of this patent subsequent to Dec. 28, 2010 has been disclaimed.

[21] Appl. No.: 173,185

[22] Filed: Dec. 23, 1993

Related U.S. Application Data

[62] Division of Ser. No. 554,133, Jul. 17, 1990, Pat. No. 5,274,693.

[51] Int. Cl.$^6$ .......................................... H04M 11/00
[52] U.S. Cl. ..................................... 379/355; 379/88; 379/59
[58] Field of Search .................... 379/58, 59, 61, 62, 379/67, 88, 89, 216, 354, 355, 356, 357, 368

[56] References Cited

U.S. PATENT DOCUMENTS 4,737,976  4/1988  Borth et al. ........................ 379/58
5,274,693  12/1993  Waldman ........................... 379/355

Primary Examiner—Curtis Kuntz
Assistant Examiner—Dwayne D. Bost
Attorney, Agent, or Firm—Goodman & Teitelbaum

[57] ABSTRACT

An abbreviated dialing apparatus especially suitable for cellular/mobile phone use, enabling a user to dial telephone numbers having repetetive digits without directly dialing all of the repetetive digits. The user, by executing a prescribed actuation of a prescribed key, such as the SEND key, can cause the system to complete an incomplete telephone number having repetetive finishing zeroes or other repetetive finishing digits, instead of directly dialing all of the repetetive digits. By determining whether a call is local or long distance, the apparatus determines the number of digits necessary to properly complete a telephone number and completes the number by filling in any missing finishing digits. Alternatively, the user by actuating a finish digit key or a finish zero key can cause the system to similarly fill in any missing finishing digits to complete an incomplete telephone number.

3 Claims, 11 Drawing Sheets

DEDICATED KEYS

ABBREVIATED AND ENHANCED DIALING APPARATUS AND METHODS PARTICULARLY ADAPTED CELLULAR OR OTHER TYPES OF TELEPHONE SYSTEMS

CROSS-REFERENCE TO RELATED APPLICATION

This is a division of application Ser. No. 07/554,133, filed Jul. 17, 1990, now U.S. Pat. No. 5,274,693, issued Dec. 28, 1993.

CROSS-REFERENCE TO RELATED DISCLOSURE DOCUMENTS

The subject matter of this application is related to the following five disclosure documents:

1. Telephone Key-pad Dial-out Enhancement systems-Dial-out of a Repetitive Digit by a Single Key-Stroke Actuation. No. 197,095 Jul. 18, 1988

2. Long-Distance Phone Number Dialing Enhancement. No. 199,250 Aug. 15, 1988

3. Abbreviated & Enhanced Dialing Systems for Cellular & other type phones. No. 204,334 Sep. 16, 1988

4. Abbreviated Voice Response Dialing. No. 240,049 Nov. 24, 1989

5. Abbreviated & Enhanced Dialing Apparatus & Methods Particularly Adapted for Cellular or other types of Telephone Systems. No. 241,160 Dec. 5, 1989

In addition, this application is related to a pending application filed by the applicant in the U.S. Patent Office on Mar. 5, 1990, Ser. No. 07/491,933, now abandoned entitled AUTOMATIC AREA CODE DIALING APPARATUS AND METHODS PARTICULARLY ADAPTED FOR CELLULAR OR OTHER TYPES OF TELEPHONE SYSTEMS.

BACKGROUND OF THE INVENTION

This invention relates to telephone dialing apparatus and more particularly to an abbreviated enhanced dialing apparatus and a method of dialing which is particularly adaptable for cellular telephone systems.

Over the past years great strides have been made in implementing the rapid dialing of telephone numbers. Thus, as one will understand, present modern systems utilize a dialing keypad consisting of a series of momentary operated dialing keys or switches. In conjunction with the keypad the telephone subset may incorporate either touch tone or pulse dialing to enable a rapid dialing sequence. Many telephone subsets also include memory systems whereby one can dial a telephone number by accessing separate memory keys or accessing a memory location via the keypad.

DESCRIPTION OF RELATED ART

A prior-art search revealed numerous speed-dialing patents of this (memory-system oriented) type. The following is a listing of these patents:

| No. | Date | Title |
|---|---|---|
| 4,103,115 | 7/25/78 | MEMORY TONE DIALER |
| 4,277,651 | 7/7/81 | TELEPHONE DIALER |
| 4,473,720 | 9/25/84 | AUTOMATIC DIALER FOR TELEPHONE NUMBERS WITH PORTABLE MODULE |
| 4,682,357 | 7/21/87 | AUTOMOBILE TELEPHONE APPARATUS |
| 4,723,265 | 2/2/88 | ABBREVIATED DIALER WITH REDUCED KEY OPERATION |
| 4,736,410 | 4/5/88 | TELEPHONE EQUIPMENT FOR REDUCED KEY OPERATION |
| 4,764,951 | 8/16/88 | AUTO DIALER FOR USE WITH TELECOPIERS OR THE LIKE |
| 4,885,762 | 12/5/89 | TELEPHONE APPARATUS |

Thus, the prior art is cognizant of various techniques to enable enhanced abbreviated dialing by a telephone user. However, the prior art does not disclose or anticipate anything except memory-system treatments and methods for pre-storing telephone numbers under selective user control for later selective recall, whereas the instant invention deals with enhanced abbreviated dialing of non-pre-programmed telephone numbers through the use of traditional system dialing resources, without forethought or prior user action, and with no "permanent" or "pre-programmed" storage.

It is understood, of course, that any technique which enables faster dialing will enhance the operation of telephone systems, but in particular regard to cellular phone systems, the process of dialing is extremely hazardous. There have been many articles written which describe the hazards imposed by dialing on a cellular system while manipulating an automobile, and it is thus obvious that any improvement or enhancement of the dialing procedure will be particularly advantageous and valuable in connection with cellular phones.

The apparatus and methods to be described enable abbreviated and enhanced dialing of many telephone numbers, reducing the number of required key actuations by the user according to the format of the telephone number.

The method and apparatus depend upon particular digits of the telephone number being the same and being repetitive. In this manner, one can dial certain telephone numbers rapidly utilizing the system to be described. The principle feature of the present invention is that successively repeated digits are keyed in by the dialing user one time only. For example, an existing phone number may end with the digit zero repeating four times as for example "0000," and in a conventional dialing procedure the key indicative of zero would be actuated a commensurate number of times in succession (four in the above example).

As one can understand, such multiple actuations may result in many errors, not to mention additional wear and tear on the keypad assembly associated with the telephone. Thus, this invention has uniform and characteristic advantages in the case of telephone numbers which finish or end in the particular digit repeated several times, since it eliminates the requirement of a user having to repeatedly actuate the same digit key. In regard to one aspect of this invention, the user will actuate the digit key only once upon reaching the repetitive digit, after which the system will automatically repeat dialing the repetitive digit as many times as necessary to complete a valid telephone number.

As one can understand, the main object of the invention is to advantageously utilize the characteristics of the many telephone numbers having a single digit repeated one or more times, as both a finishing digit or elsewhere in the telephone number. This phenomenon is especially prevalent with the digit zero, and many important telephone numbers such as those for corporations, law firms and other businesses end in a number of zeros. Some examples of this would be "1000," "8800," "0000," and so on. Apart from this, certain other phone numbers end in repeated non-zero digits such as "5555," "7666," and so on. Numerous additional examples are readily available by accessing conventional telephone directories.

Thus, this feature of the instant invention will enable a user to automatically dial these successively repeating digits by keying in the digit only once. For example, in a phone number ending with the digit "5" repeating four times, a conventional dialing procedure would call for the "5" digit key to be activated four times in succession. However, in the invention the user will need only activate the number "5" digit key once, and then further indicate that it is a repeat digit. As will be explained, this operation can be implemented in a conventional system by a prescribed actuation procedure of the repeat digit key, or unconventionally by means of separate keys such as a finish zero key and a finish final digit key. In the case of phone numbers ending with repetitive zeros, the user will merely actuate a finish zero key to cause the completion of the number with zeroes. For numbers ending in repetitive digits other than zero, the user will first access the repetitive digit key once, then actuate the finish digit key to complete the number with copies of the repetitive digit.

Alternatively, in a store & forward system (including most cellular systems), actuation of the SEND key could automatically cause the number to be completed in either form; by filling in the finishing digits either with zeros or with the final digit keyed-in, depending upon which method of the invention is utilized. As will be explained, upon the user activating the SEND key, the system will recognize the last digit entered, and further recognize that in order to constitute a valid telephone number, additional digits must be added to those already keyed. The system of the invention would then proceed to transmit the manually dialed digits over the cellular network, afterward automatically filling in the requisite repetitive digit the required number of times to create a valid telephone number.

As one will readily understand from the following descriptions, it is a main feature of the instant invention to enable a user to perform abbreviated dialing of any successive repetitive digits associated with a telephone number. In this manner both the cellular users and other telephone users will be able to perform dialing more rapidly. It is also indicated here that the abbreviated dialing system to be described can be utilized in any typical telephone system, whether touch-tone, rotary, or pulse.

OBJECTIVES OF THE INVENTION

According to the abbreviated dialing concept as described above, multiple copies of any digit can be generated consecutively by only a single digit key actuation, instead of requiring sequential multiple key actuations as in conventional dialing. By utilizing such an approach, many benefits are achieved. First, the user does not have to repeatedly dial identical finishing digits or triple repeating digits, reducing the probability of wrong numbers, since a one time actuation of a key is fundamentally more positive and reliable than multiple actuations. Also, in this manner, the abbreviated dialing system will save and conserve the life of a keypad.

In regard to cellular applications, it is also immediately apparent that due to the decrease in the number of digit entries and the corresponding increase in the speed of dialing, the probability of road accidents while dialing is proportionally reduced.

DIALING BY DIGIT CATEGORY GROUPS

A novel category segmented-dialing approach is set forth which treats a phone number not as a composite of a series of unrelated digits, but rather as a segmented numeric entity comprised of several possible digit categories, to wit:
a) a Multiple Successive Repetition of a digit,
b) a Multiple Successive Repetition of any Finishing digit,
c) a Multiple Successive Repetition of a Zero ("0") Finishing digit.

A one-touch key actuation may effect the dial-out of any multiple number of digits in any one particular category, so that each category dial-out is accomplished by only a single key actuation instead of redundant key actuations corresponding to the individual digits, as is the case with conventional dialing procedures.

SUMMARY OF THE INVENTION

A method for accommodating abbreviated telephone dialing in a telephone system when dialing a telephone number via a keypad or other dialing means, said telephone number having a number of repetitive digits appearing sequentially in said telephone number, comprising the steps of dialing said telephone number in sequence via digit dialing keys of said key pad until a first repetitive digit is reached or entered, and thereafter causing said repetitive digit to be automatically dialed a given number of times without further actuation of said digit dialing keys of said keypad.

BRIEF DESCRIPTION OF THE FIGURES

FIG. 22 is a block diagram showing voice recognition dialing in conjunction with a telephone company central office (C.O.) or a cellular cell switching center.

STATE OF THE ART COMPONENTS

Figure 1:
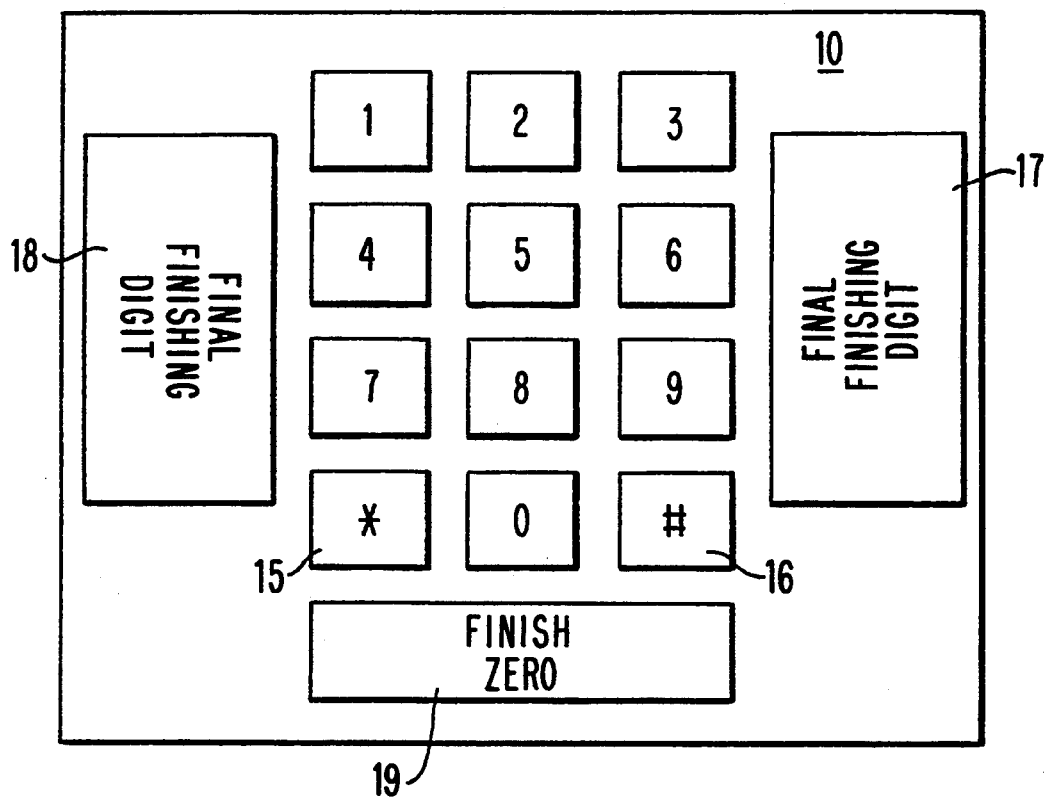
FIG. 1 is a top plan view of a telephone keypad arrangement according to this invention.

Many elements and modules of the system are well known in the state of the art and are therefore shown in block form without delving into the details of their design and construction. This approach is used in order to facilitate the clarity and simplicity of the specification and to avoid undue cluttering of the drawings.

A DC power supply is not shown, since any power supply suitable to the components and well known in the state of the art could be used to power the various modules, components, and circuitry. Phone-line voltage could also be used to power the system directly, as is well known in the state of the art.

The various digit-detect, storing, counting, and dialing modules contained in the system are all in widespread use and are similarly well known in the state of the art.

DEFINITION OF TERMS USED

Valid Telephone Number:

All telephone company central office systems have certain criteria and conventions for determining what digits and what number of digits may constitute a telephone number for making a connection from a calling party to a called party. A Valid Telephone Number is a number in accordance with such known conventions which has been or may be forwarded to the connected central office system in order to make such a connection.

Store & Forward:

A common method of telephone dialing wherein a string of digits is temporarily stored when entered by the user, then sequentially forwarded as a unit onto the telephone line after entry, usually at the user's request by means of a "SEND" or "TRANSMIT" key specific to the purpose. Some systems alternately make use of a timing algorithm whereby forwarding occurs when a specific time period elapses with no further digit or command entry having been made, and other systems alternatively forward upon detecting the entered digit string as constituting a valid phone number. Some systems also use various combinations and permutations of all of these, as none of the methods are mutually exclusive. They nevertheless treat the phone number and not the individual digits as the most discrete entity determining forwarding, and therefore constitute store & forward systems.

Direct Dial:

A common method of telephone dialing wherein digits are forwarded onto the telephone line as soon as they are entered by the user, and wherein the individual digits are the most discrete entities in determining when to forward to the line. Some implementations of these systems may make use of a temporary "buffer" memory, especially in pulse-dialing systems wherein dialing a digit may require a second and a half, allowing the user to enter digits faster than the system can dial them. Such digits are nevertheless put on the line as quickly thereafter as the system can manage, and such systems are still Direct Dial.

Memory -system:

This refers to a system wherein by means of a specific protocol, the user may enter and transfer a number into a "permanent" storage location for later recall access by the user, with the location being unmodified by the system except by specific and selective user request.

Prescribed Actuation:

A unique action by the user according to a given protocol with accomplishes a unique predetermined task or result.

Prescribed Key:

A key assigned for use in accordance with a prescribed actuation, which by such use accomplishes a unique predetermined task or result.

TRD/Triple Repeat Digit:

1) Any digit recurring three times in sequence anywhere in a given phone number, but not inclusive of the final digit of the complete number.

2) A dialed digit to be automatically iterated three times in succession upon output to the phone line.

RFD/Repeat Finishing Digit or FFD/Final Finishing Digit:

1) Any digit occurring more than once in sequence at the end of a complete phone number.

RFZ/Repeat Finishing Zero or FZ/Finishing Zero:

1) The digit "0" (zero) occurring more than once in sequence at the end of a complete phone number.

Dedicated Key:

Any key with single-keystroke use(s) specific to the Invention.

Satellite Key:

A key functionally associated with another specific key (typically a digit key) and performing subsidiary actions specific to that key.

Hold-Down Protocol/Press-and-Hold Protocol:

A protocol whereby a user depresses a key uninterrupted for a given interval (or longer) in order to signify an action different from that of a depression shorter than the interval. In order to insure a positive delayed-release action of such a key, such a protocol may involve a delayed (or second) audible tone, audible phrase, or other type of system-acknowledgement of the alternate key function.

Dual-Press Protocol/Dual-Actuation Protocol:

A protocol whereby a user presses a key a second time in succession to accomplish a result different from that of a single press.

Multi-Press Protocol/Multi-Actuation Protocol:

A protocol whereby a user presses a key a predefined number of times in succession to accomplish a result different from that of a single or other number of presses.

Auto-Dial:

This phrase is used as a short form meaning "Automatic System Dial-out."

Timed (Key) Depression:

Refers to a Hold-Down Key actuation as defined above.

DETAILED DESCRIPTION OF THE FIGURES

Referring to FIG. 1, there is shown a typical telephone keypad assembly 10. Essentially the telephone keypad assembly 10 contains a series of keys or push buttons designated as "1" to "0" and a "*" and a "#" key 15 and 16. The telephone keypad 10 has a large key 17 on the right as well as a large key 18 on the left side. The keys 17 and 18 are designated as FFD, which stands for Finish Final Digit, as will be further explained. There is also shown a key 19 at the bottom of the keypad designated as the Finish Zero Key.

As indicated briefly above, the object of the invention is to minimize the amount of dialing required by a user when accessing or dialing a telephone number having repetitive digits. Of present concern are repetitive digits which terminate or end the number. As explained above, a very common ending digit is the digit zero. Many telephone numbers end in repetitive zeros as for example four zeros, three zeros, and so on.

The user of the system having a keypad as shown in FIG. 1 will access the system as follows. First, let us assume that the telephone number a user desired to dial was a local number ending in all zeros, such as "887-7000". In this example there are three zeros which terminate the telephone number. In order to dial this number according to the present system, the user would access the keyboard shown in FIG. 1 and manually dial "8877," then actuate key 19 which is the Finish with zero key. In a conventional Touch-Tone telephone system, the system will ignore any digit in excess of the seven required for a local number or the ten required for a long distance number (excluding the leading access-digit "1"). Present telephone systems will attempt to connect the calling party to the called party when the required digits are received, and one can therefore insert any number of additional zeros, with the connected system still acknowledging it as the proper number of zeros to access the requested number. Thus, in regard to the telephone number "887-7000", after manually dialing the final "7", one merely activates key 19 to transmit five or more zeros, which will be acknowledged as only three additional zeros regardless of the excess, and will thus cause the system to connect the call to "887-7000". Hence, as one can see, if the same telephone number ended in four zeros, one would merely again dial the first three digits "887," then press the finish zero key 19 whereby five zeros would automatically be sent to the central station, which still ignores the additional digit and provides a connection to the correct telephone "887-0000". Thus, as one can see, it is not necessary in present direct-dial systems to actually count the number of digits dialed. This is necessary in many cellular and store & forward systems as will be explained, but may be advantageously utilized in conventional telephone systems as well.

The same above-described procedure can also accommodate telephone numbers which finish with repetitive digits other than zero. For example, in the telephone number "436-7777," the digit "7" is the finishing digit repeated four times. In order to implement the dialing procedure, the user again will dial in the digits "436," then dial the first "7," then activate key 18 or key 17, which is the finish final digit (FFD) key. The system will similarly dial four or five sevens, recognizing that the last digit accessed by the user prior to depressing the key 17 or 18 was a "7," with the central station similarly ignoring the excess. Thus, the user can insert repetitive digits which terminate a telephone number without redundant keypresses.

Keys 17 and 18 are located as shown on the right and left sides of the keyboard 10 for convenience. If the finishing digit of a telephone number was "3", "6", or "9" it would be easier to access key 17, while if the finishing digit were "1," "4," or "7" it would be simpler to access key 18. Thus, the two keys are shown and can be employed as such. It is also understood that the function of the FFD keys 17 and 18 could also be implemented by the "*" and "#" keys 15 and 16.

Figure 20:
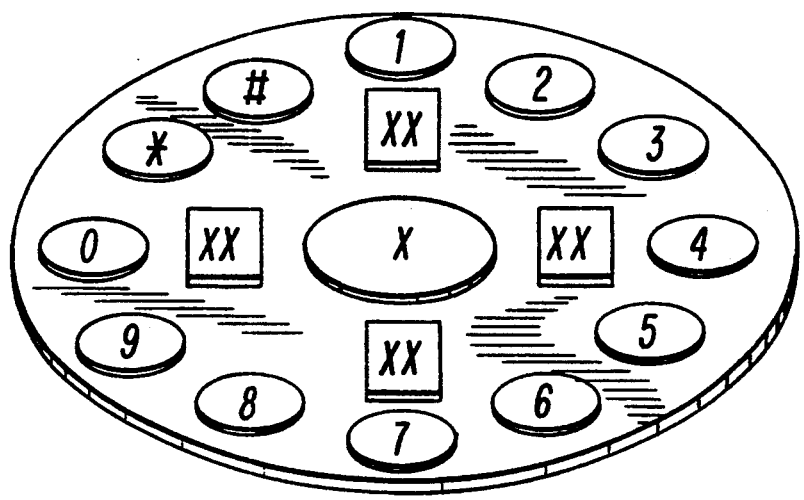
FIG. 20 is a diagram of a circular keypad according to this invention having one dedicated Finish Zero (FZ) key and four dedicated Finish Digit (FFD) keys.

FIG. 20 illustrates another configuration, using a telephone keypad of a circular design. This design offers the advantage that since the dedicated keys are located in the center of the keypad, they are conveniently accessible from all of the digit keys. In this configuration the keys designated 17a and 18a are functionally equivalent to keys 17 and 18 of FIG. 1, respectively, and the center key marked 19a is functionally equivalent to key 19 of FIG. 1.

While the above-noted examples took advantage of the fact that the telephone system will only recognize the first seven digits, it is certainly understood that one can instead count the digits and fill in the exact number of finishing digits to implement a valid telephone number. It will also be explained how one can implement a triple repeat digit (TRD), which may occur elsewhere in a telephone number, and not just as a finishing digit. This can be implemented by utilizing the same techniques shown, as will be explained. Thus, from the above discussion, one can readily see that the telephone keypad, apart from keys 17, 18 and 19, appears conventional. One can also implement the above-noted functions by a hold-down protocol, wherein a key is pressed and held for a short period. When the requisite period is over, the hold-down may be acknowledged by a beep or other signal indicating that the system has accepted the instruction for a finishing digit, finishing zero, etc. As will be explained, in many cellular systems, one cannot dial more than the requisite number of digits in accessing a telephone number, and the actual digits dialed must therefore be known and determined by the system.

Figure 2:
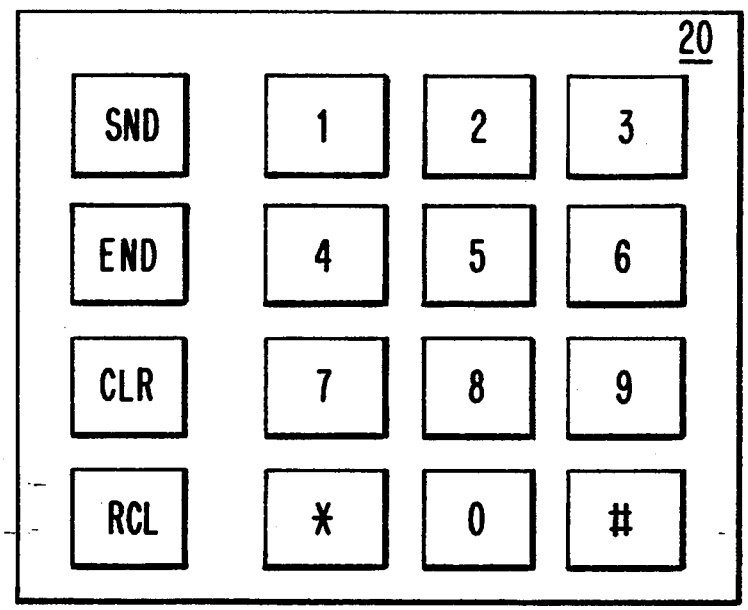
FIG. 2 is a top plan view of a telephone keypad arrangement utilized in a cellular system.

Referring to FIG. 2, there is shown a typical cellular (or store & forward) telephone keyboard 20. As shown, this keyboard 20 utilizes the conventional keys "1" through "0" and the "*" and "#" keys, but also employs a send (SND) key, an end (END) key, a clear (CLR) key, and a recall (RCL) key. The clear and recall keys are for purposes of clearing the display and (for example) redialing the last dialed number.

In a cellular system, after a telephone number has been dialed in, one must depress the SEND key in order to transmit the number to the cellular network and inform the network that a connection is desired. In such a system, one can implement aspects of the invention merely by counting digits and automatically filling in the proper number of digits as necessary upon depression of the SEND key. For example, let us assume that the user desires to dial "775-0000". In employing finishing zero in this system, the user would dial "775" and then press the SEND key. The system will recognize that a local call is being made (because of the absence of a long-distance access digit), and further determine that the user has only dialed three digits, meaning that four digits are missing from a local (7-digit) number. The system would therefore automatically fill in the last four digit places with "0000," and activating the SEND key is thus analogous to activating the Finish Zero Key 19 of FIG. 1. In a similar manner, one can implement finishing digit by utilizing a press-and-hold protocol linked to the digit keys without conflicting with the FZ function. If the user desired to dial the telephone number "777-8666", he would dial "77786," then hold down the "6" key until the system acknowledged the hold-down. Again the system would determine that only five digits had been dialed and that two more are necessary, and thus would automatically include two additional sixes to complete a valid telephone number.

As one can ascertain, the system can as easily implement the above procedures for long distance dialing. In long distance dialing the user dials a long-distance access digit, then proceeds to dial a ten digit number, the first three digits being the area code and the remaining seven being the telephone number. The system can recognize that a long distance number is being dialed by determining that the first depression was the "1" key, and thereafter will expect ten digits, not seven. If ten digits are not received, the system will again fill in the necessary digit based on the above techniques. For example, if the user desired to dial the number "212-775-0000", he would proceed by first dialing a "1", then dialing the area code "212", then dialing "775", and finally actuating the SEND key. The system would determine that a long distance number was being dialed after depression of the "1" key, and would expect ten additional digits, but since the user only dialed six of them, the system would fill in the last four digit places with "0000".

In conventional direct-dial telephone systems, excess digits dialed after the ten digits or seven digits are ignored, but if this is done on a cellular system, one will receive a message that the number dialed is not a valid telephone number. The system captioned above avoids this, and will always dial-out the correct number of finishing digits. These capabilities all serve to appreciably expedite the dialing process for the many telephone numbers which end in repetitive digits.

FORMAT OUTLINE

In order to present a clearer understanding of the specification, the following format will be used.

The implementation of the abbreviated dialing of the various cited digit categories in accordance with the teachings of the invention will be described in connection with various telephone instrument types and various types of dialers, dialing apparatii, and devices.

At the outset we will set forth, by way of example only, the various phone and dialer types in use today, grouped in accordance with their respective categories.

1. SEND KEY ACTUATION DIAL-OUT/STORE & FORWARD ALGORITHM
    a) Cellular Phones
    b) Some Telecopier (Fax) Machines
    c) Some PBX-connected Phones (in some systems presently available)

2. DIRECT DIALING PHONES & DEVICES DIALING DIGITS AS THEY ARE ENTERED
    a) Key Phones
    b) Residential Phones
    c) Cordless Phones
    d) Auto Dialers
    e) Hand-Held Dialers
    f) Hotel/Motel/Hospitality Phones
    g) Some Telecopier (Fax) Machines
    h) Some PBX-connected Phones (in some systems presently available)

SEND Key actuation dial-out systems store the digits in a temporary "buffer" memory as they are keyed-in, for later output to the phone network. The output (forwarding) of the stored digits takes place upon actuation of a SEND key at the conclusion of the dialing process, hence, this is known as Store & Forward Dialing. This method of dial-out to the phone network is used in cellular phones and some fax machines, as well as some other types of phones and dialing systems.

We will now address the abbreviated dialing methods of the invention as they apply to Store & Forward dialing systems.

SUCCESSIVE REPEAT FINISHING DIGIT/CELLULAR PHONES

With cellular phones, the dialing process represents an obvious potential safety hazard to the user and his vehicle, as well as any pedestrians and vehicles around him. It is clear that any improvement or enhancement of the cellular dialing process would be advantageous and valuable in terms of more than saved time.

In regard to this cellular-related safety factor, there have been various voice-dialing schemes attempted. Generally the problems with them have been that they are speaker-dependent and unreliable, frequently tending to mistranslate digits and dial wrong numbers. As will be seen, the instant invention is compatible with such voice-dialing systems, or may utilize the existing keypad on a cellular phone. The method of the invention provides that, depending upon the digit make-up of a particular phone number, the dialing motions may be reduced significantly for any phone number. At present the large proportion of cellular users are business oriented, and since business telephone numbers tend toward repetitive, easy-to-remember sequences, such users could save 30 to 80 percent of their dialing keystrokes with a phone employing the methods of the invention.

The principle feature of the invention is that successively repeating digits are keyed-in by the user only once. For example, if a phone number ends with the digit "5" repeating four times, i.e., "5555," in conventional dialing procedures the "5" digit key would be pressed four times in succession. In comparison, in employing the method of the invention, the user would need only to actuate the digit "5" key once, and subsequently would need only to activate the SEND key on the cellular telephone keypad. Upon actuation of the SEND key, the System of the invention will recognize the last digit entered ("5" in this illustration), and further recognize that three additional digits are necessary in order to constitute a valid telephone number. The System will proceed to transmit the manually dialed digits to the cellular network, and then will additionally auto dial the last digit "5" the remaining three times necessary to make the transmission into a valid telephone number.

It is now evident that by application of the instant invention's dialing logic System to cellular dialing, the multiple keystrokes called for in the three digit formats outlined previously;
i) Multiple Repeat Finishing Digit (MRFD);
ii) multiple Finishing Zero Digit (FZD); and
iii) Triple Repeat Digit (TRD); are reduced to only one keystroke, enhancing the dialing procedure and adding appreciably to the alialet's driving safety when dialing a cellular car phone.

In a system utilizing the SEND key for FZD and a hold-down protocol for MRFD, the user could choose to use either function; i.e., he could press and hold the "0" key and press SEND (the MRFD protocol), or instead simply actuate SEND without accessing the "0" (the FZD protocol). Either action would cause the System logic to auto dial as many zeroes as needed to complete a valid telephone number.

TELECOPIER (FAX) MACHINES—Many fax machines also employ a SEND key, and prescribed key-in procedures identical to those outlined for cellular phones would be used in such instances.

It should be noted here that the afore-described prescribed dialing and digit key actuation procedures can be applied to effect the abbreviated keying-in of a repetitive finishing 0, or any other digit, in reverse relative to the above illustrations. Specifically, this is to say that instead of using the key hold-down actuation method to effect the system fill-in of any repetitive finishing digit and the SEND key actuation to effect the fill-in of the additional 0's, the hold-down method would serve instead to fill in the necessary additional 0's, while the SEND key actuation would serve to fill in the necessary additional finishing digits.

Either approach is workable, and the choice would merely be a function of which logic is desired.

At this juncture, an alternate method will be described as follows:

Whether to fill in the necessary number of digits with 0's or the last digit keyed-in would be determined solely by a prescribed actuation of the SEND key.

Specifically, a successive dual actuation of the SEND key would fill in the missing number of digits with 0's, whereas a single actuation of the SEND key would fill in the necessary number of digits with the last digit keyed-in.

Alternatively, here again the system could be programmed to effect the reverse; i.e., with a single actuation of the SEND key resulting in FZD, and a dual actuation would resulting in MRFD.

Still another approach is disclosed, wherein a single SEND actuation would effect the fill-in of the last keyed-in digit, while a hold-down of the SEND key would serve to fill in the missing number of 0's required to complete a valid telephone number, or vice versa.

Still another approach that could be used is to have the SEND key operate normally on only a single actuation, but operating to accomplish MRFD on a dual actuation of SEND, and FZ on either a triple SEND key actuation or (alternatively) a hold down of the SEND key. Once again, these functions could also be incorporated in the reverse manner.

CUSTOM DESIGN SEND KEY

Figure 10:
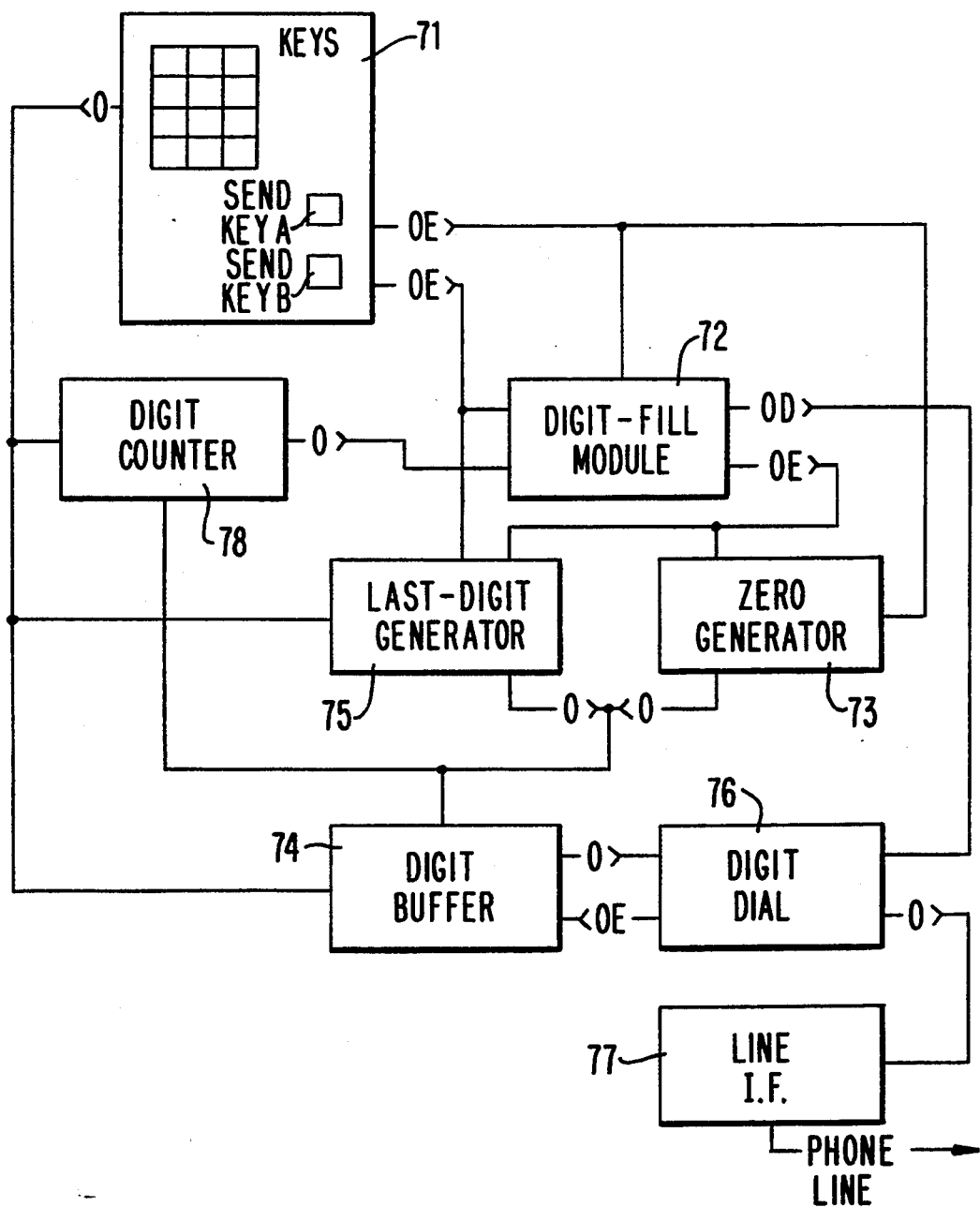
FIG. 10 is a block diagram of an abbreviated dialing system according to this invention using two SEND keys, applicable to cellular phones, fax machines, etc.

An alternate approach to the aforementioned methods is to provide any one of a number of custom SEND key configurations as hereafter described:

FIG. 10 shows two SEND keys used; SEND Key A and SEND Key B.

Figure 11:
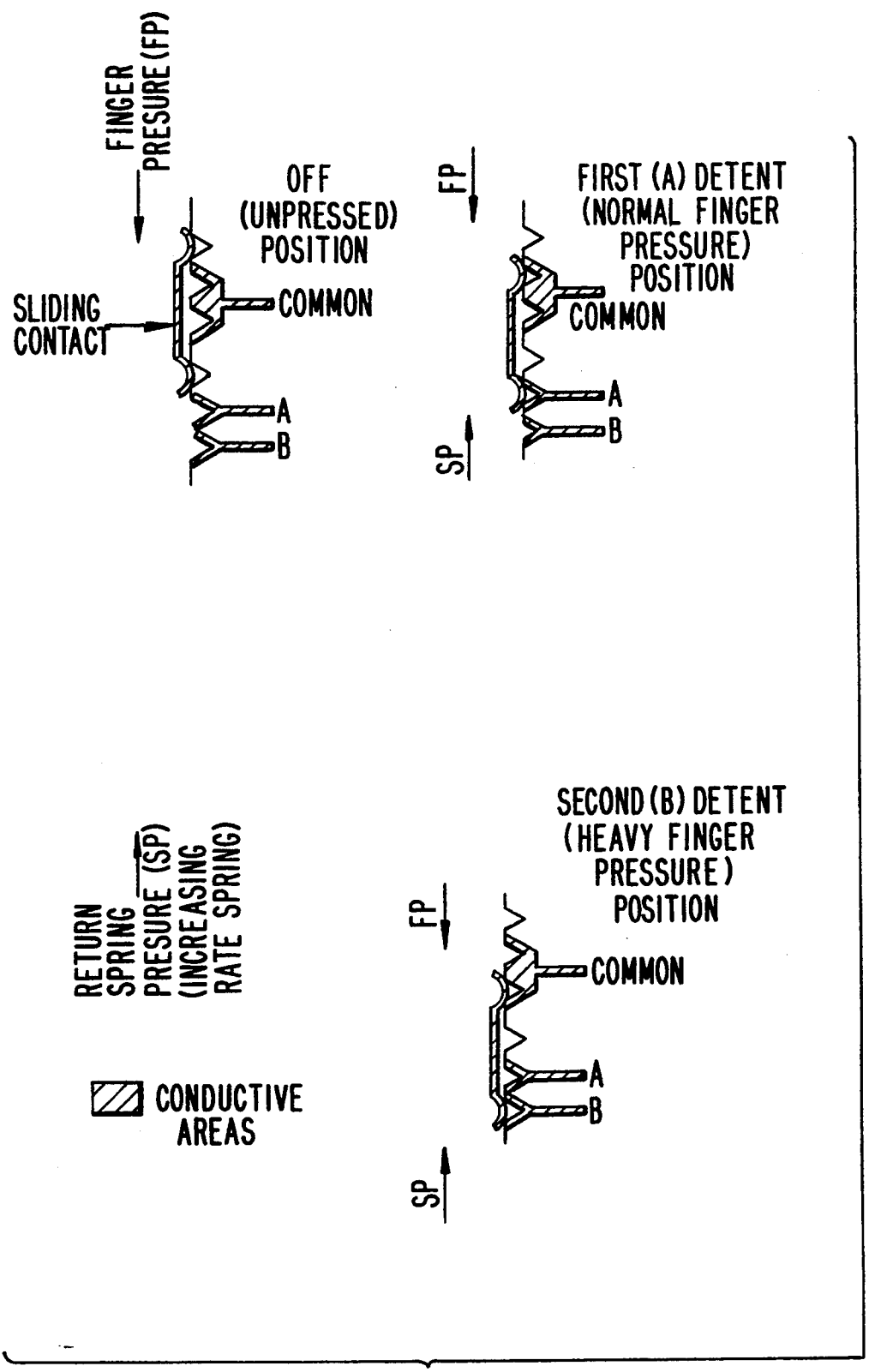
FIG. 11 is a schematic mechanical diagram of a momentary two-position pushbutton switch.

FIG. 11 shows a single SEND key with two switching positions; Position A and Position B.

Figure 12:
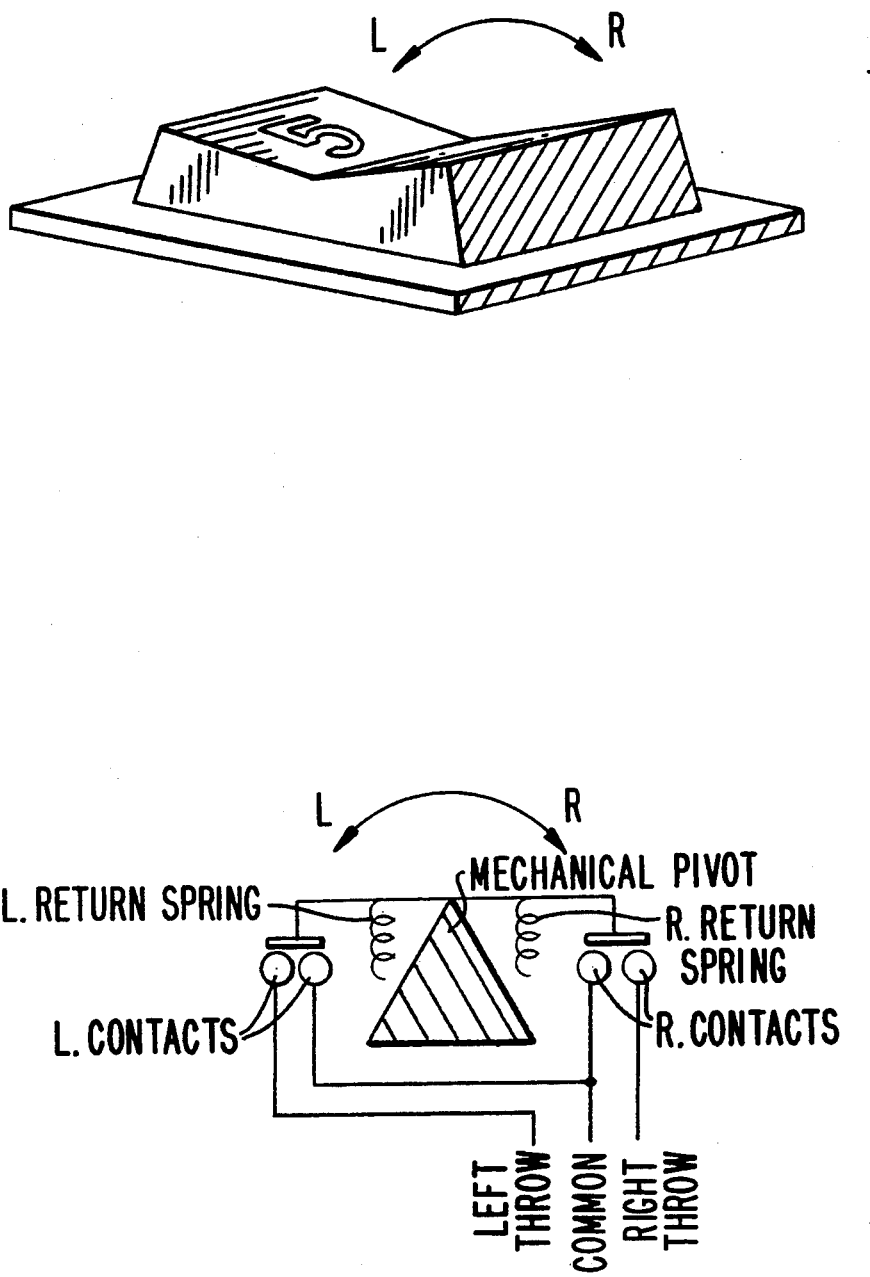
FIG. 12 is a representative diagram of a two-position rocker type switch.

There are numerous types of two position switches available and well known to the state of the art. One type which could be used is a rocker type dual position switch also well known to the state of the art. FIG. 12 shows one example of same.

It should be noted that there are many other types of single, dual, and multiple position switches, all available and well known to the state of the art, which might be useful for implementing various aspects of the invention. Examples would be multiple-detente switches or membrane type switches configured to act as multiple-function keys.

In the case of the two SEND keys method (FIG. 10), SEND Key A and SEND Key B, in order to cause the system logic to fill-in the necessary number of last keyed-in digits, the user actuates SEND Key A. In order to fill-in with the necessary number of missing zeroes, the user actuates SEND Key B.

Here again, the system logic can be programmed to effect a reverse result. This is to say that actuation of SEND Key A would fill-in with the necessary number of missing zeroes, whereas actuation of SEND Key B would operate to fill-in the necessary number of the last keyed-in digit.

The operation of the two SEND keys is now described in connection with FIG. 10:

The Digit Counter (78) counts the digits as they are keyed-in on the keypad (71). The Digit Fill Module (72) detects a call as local or long-distance and accordingly determines the number of digits that will constitute a valid telephone number.

Upon actuation of SEND Key A, the Zero Generator (73) is enabled to generate a number of zeroes, while the Last Digit Generator (75) remains disabled. The generated zeroes are stored in the Digit Buffer (74) like ordinary digits from the keypad, and are likewise fed back to the Digit Counter (78) which is monitored by the Digit Fill Module (72). When a sufficient number of zeroes have been generated, the Digit Fill Module (72) removes the enable from the Zero Generator (73) and enables the Digit Dial (76) section for output.

upon actuation of SEND Key B, the Last Digit Generator (75) is enabled to generate a number of copies of the last digit keyed-in, while the Zero Generator (73) remains disabled. The generated digit copies are stored in the Digit Buffer (74) like ordinary digits from the keypad, and are likewise fed back to the Digit Counter (78) which is monitored by the Digit Fill Module (72). When a sufficient number of digit copies have been generated, the Digit Fill Module (72) removes the enable from the Last Digit Generator (75) and enables the Digit Dial (76) section for output.

Finally, when the Digit Fill Module (72) enables the Digit Dial section, the Digit Dial (76) section in turn enables the output of the entire valid telephone number from the Digit Buffer (74), accepts the information and passes it sequentially to the Line Interface (77) which outputs it to the phone line.

SUCCESSIVE REPEAT TRIPLE DIGIT

Another multiple repeat digit format which the invention addresses is Triple Repeat Digit (TRD). This is when a digit is repeated three times in succession as part of a phone number but not necessarily at the end of the phone number. This is another digit sequence found frequently in telephone numbers. To incorporate it with FZD using the SEND key, the following method could be adopted without conflict:

In the case of TRD, the user is instructed to delay the release of the digit key for the triple repeating digit until a release tone, phrase, or other release signal is given by the System.

In the case of FZD, the user is instructed to delay the release of the digit key for the digit immediately preceding the FZD until a release tone, phrase or other release signal is given by the System.

Subsequently, which way the System will repeat-dial depends upon the next key actuation. If the next actuation is the SEND key, the System logic will determine that the preceding delayed key release was intended to signal an FZD format. Accordingly, after dialing out the digits the user had keyed-in manually, the System would auto dial enough zeroes to constitute a valid telephone number.

If, on the other hand, the next actuation is another digit key (not the SEND key), the System logic will determine that the preceding delayed key release was intended to signal a TRD format. Accordingly, upon actuation of the SEND key, after dialing out any digits the user had keyed-in manually prior to the held-down key, the System would auto dial the digit represented by the held-down key three times instead of once, followed by any digits the user keyed-in manually subsequent to the hold-down.

Figure 7:
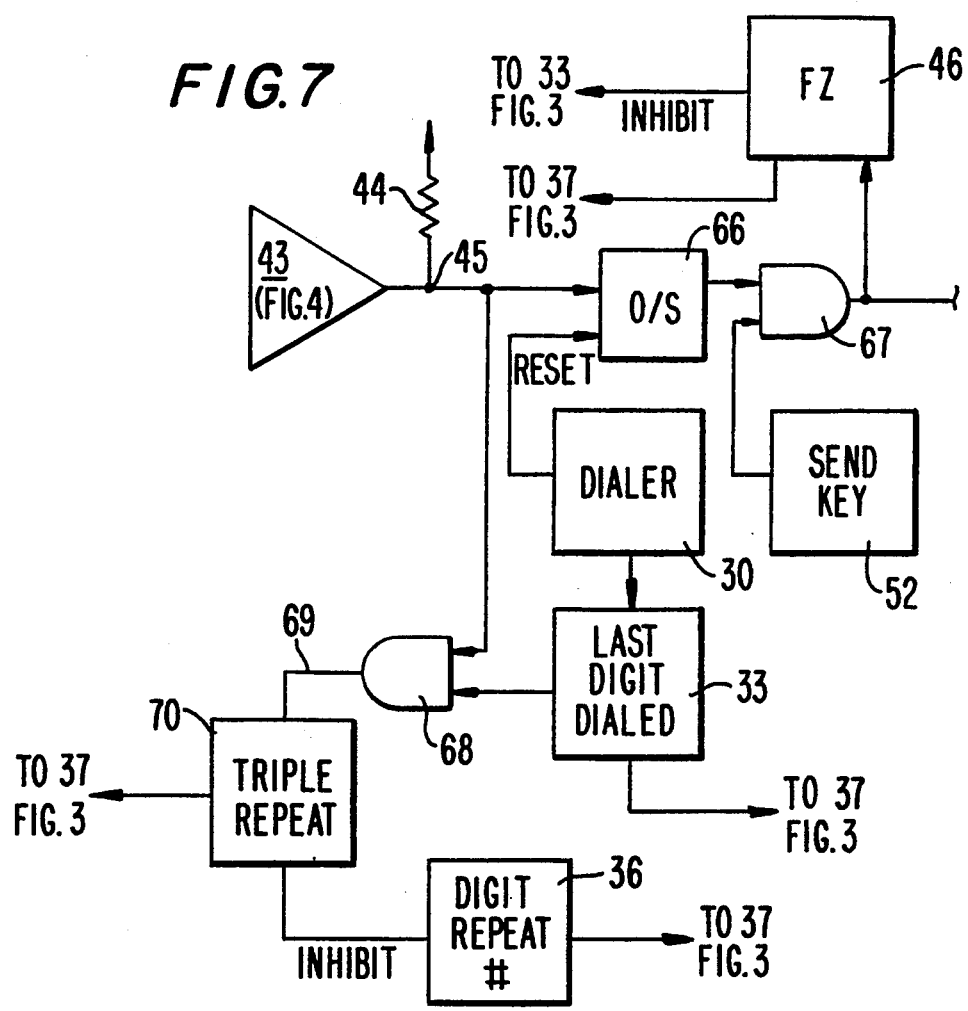
FIG. 7 is a block diagram of an abbreviated dialing method for a Triple Repeat Digit (TRD).

FIG. 7 is a logic flow diagram showing the system logic, by way of illustration, wherein a hold-down protocol of any given digit-key will result in either the dial-out of the digit associated with the given key plus RFZ, or three dial-out iterations of the digit associated with the given key. As can be seen in FIG. 7, if the SEND key is actuated following the hold-down protocol, the system will then auto repeat dial one or more zeroes. If, on the other hand, the user keys in another digit following the hold-down protocol, the system will instead automatically repeat-dial the previously held-down digit three times.

Figure 3:
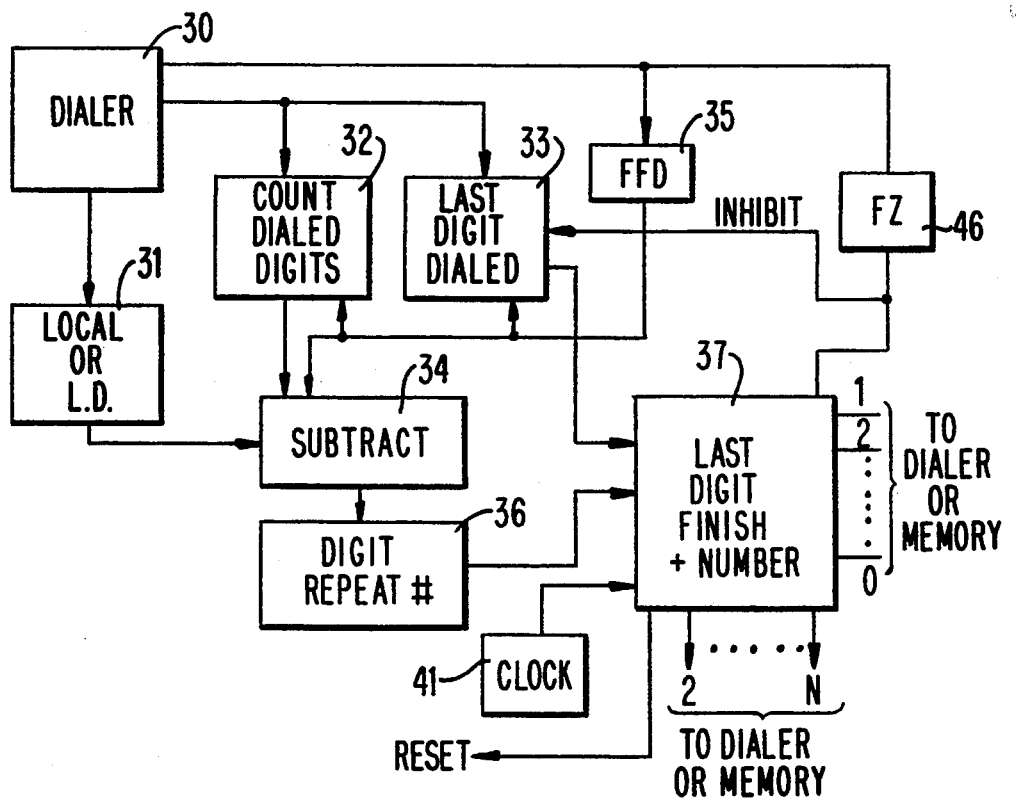
FIG. 3 is a block diagram of an abbreviated dialing system according to this invention.
Figure 4:
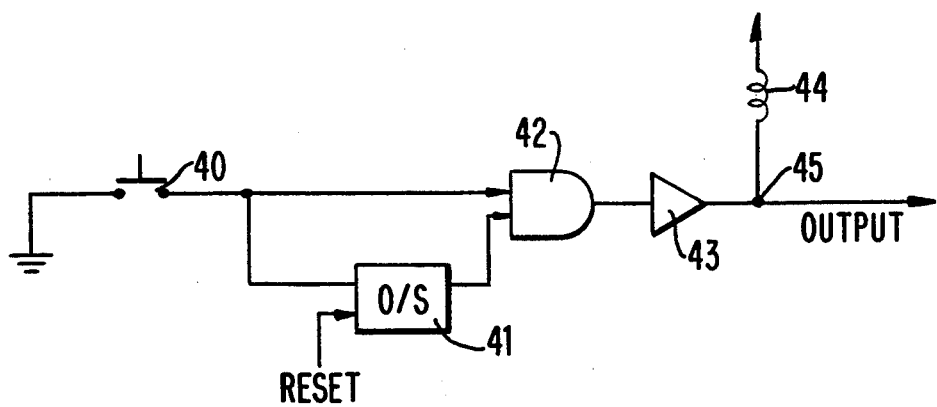
FIG. 4 is a circuit diagram of a key hold down circuit according to this invention.

Refer to FIG. 7, FIG. 4, FIG. 3:

If, following the key Hold-down actuation, the SEND Key (52) is actuated, this actuation will effect the activation of the Finishing Zero Module (46). The Finishing Zero Module in turn outputs information to module 37 of FIG. 3 and also inhibits the Last Digit Dialed Module (33) as shown in FIG. 3.

This sequence can be followed in FIG. 7 as follows:

Output (45) of Amp (43, FIG. 4) to One-Shot (66). The output of the O/S to one gate input of the AND gate (67).

The second gate input receives an input signal from the SEND Key (52) upon its actuation. As can be seen in FIG. 7, once a digit key on Dialer (30) actuated, the Reset line on O/S (66) resets the O/S.

If the SEND Key is not actuated following the key hold-down actuation, this will effect activation of the Triple Repeat Module output (70) causing module (37) of FIG. 3 to repeat dial the previously held-down digit three times in succession.

This sequence can be followed in FIG. 7 as follows:

Output (45) of Amp (43, FIG. 4) to one input of the AND gate (68).

The second gate input receives an input signal from the Last Digit Dialed Module (33, FIG. 3) resulting in an appropriate output signal on output (69) of AND gate (68), thus activating the Triple Repeat Module (70). Module (46) outputs an inhibit signal disabling the Last Digit Dialed Module (33, FIG. 3).

From the above described alternate operational methods, it is abundantly clear that many other prescribed key/prescribed actuation combinations can be readily devised to accomplish the same results.

We will now address the direct-dialing type phones and devices, which as mentioned earlier do not possess a SEND key.

DIRECT DIALING PHONES AND DEVICES

Keyphones and other types of conventional phones generally do not employ a SEND key. Accordingly, a different method of executing the teachings of the invention is required.

DELAYED RELEASE OF DIGIT KEY METHOD (DIGIT KEY HOLD-DOWN PROTOCOL)

In a direct dial device, a Digit-key hold-down protocol can be used to effect one (but only one) of the following alternative functions, exemplified as follows:

Successive Repeat Finishing Digit (RFD)

Figure 8:
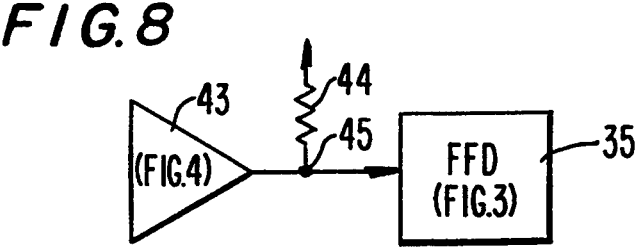
FIG. 8 is a block diagram of an abbreviated dialing method for a Final Finishing Digit (FFD).

To prompt the system to complete the total dial-out of the phone number with a finishing digit, i.e., the digit of the last digit-key actuated, the user holds said digit key until the system recognizes the held-down state of the key by some means (as indicated in FIG. 4) and thereafter announces that the key may be released; e.g., with an audible tone signal; a synthesized or recorded voice announcement; a visual display signal. Thus, upon actuation of any given finishing digit key, a user maintains the key in its actuated posture momentarily before releasing it. This delayed release will prompt the system to dial-out the particular finishing digit as many times as may be required to constitute a valid phone number. This is illustrated in FIG. 8 in conjunction with FIG. 3 and 4.

Repeat Finishing Zero (RFZ)

Figure 9:
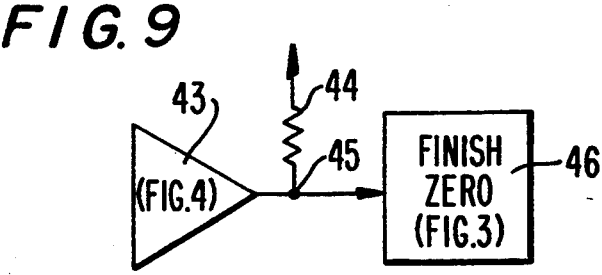
FIG. 9 is a block diagram of an abbreviated dialing method for a Finishing Zero digit (FZ).

Alternatively, instead of the above hold-down protocol effecting the automatic repeat dial of a finishing digit, the system logic may be implemented to utilize this protocol to effect the dial-out of the digit associated with the actuated key, followed by the repeated dialing-out of zeroes as many times as may be required to constitute a valid phone number. This is illustrated in FIG. 9 in conjunction with FIG. 3 and 4.

Successive Triple-Repeat Digit (TRD)

FIG. 7 is a diagram showing the system logic, by way of illustration, wherein a hold-down protocol of any given digit-key will result in three dial-out iterations of the digit associated with the given key (in the absence of a SEND key actuation, as already detailed above in connection with FIG. 7).

Digit Key Hold-Down Iterative Dial-Out

Another method that can be implemented to effect the dial-out of a repetitive digit is to have a hold-down protocol for the digit keys which generates a limited or ad infinitum dial-out of the associated digit at successively repeating intervals, continuing until a limit or for as long as the key is held. A display screen and/or an audible tone would be provided to display and/or signal each digit as it is generated by the system. If, for example, the digit "6" was to be repeated four times in succession, a user would hold-down the digit-key "6," with one "6" appearing and/or being signalled normally upon the keypress, and three more appearing at fixed intervals thereafter, each accompanied by another display digit and/or audible tone, after the fourth of which the user would finally release the key.

TIME INTERVAL/NO KEY ENTRIES

It is further indicated that abbreviated dialing may occur by implementation of a timing sequence when the user dials a last digit. For example, if a user dials "7770" and then does nothing, the system, after waiting some predetermined period; 3 seconds for example, would assume that this is the end of the dialed number and hence would fill-in the remaining three digits to complete the telephone number. In the case given, three extra zeroes would be automatically ed in to complete a valid telephone number.

This time-out sequence could also occur under more specific circumstances; e.g., when the telephone number is to be finished explicitly with zeroes. The example used above, "777-0000," can be used to illustrate this as follows:

The user would dial "777," and then do nothing. The system would commence the predetermined 3 second time period, and after no key was pressed during the period would fill-in the remaining four digits with zeroes to complete a valid telephone number.

CUSTOM KEYPAD FORMATS

Figure 6:
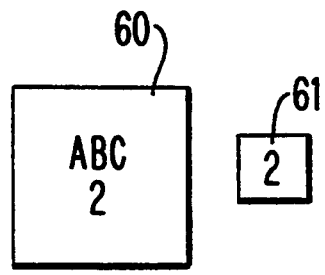
FIG. 6 is a top plan view of partial key arrangement utilized for a keyboard according to this invention.

It is further understood that the aforementioned system operation can be implemented using a different keypad format. Instead of utilizing momentary single-position switches, one can utilize a dual-position switch such as a rocker or multiple switch. Another approach is shown in FIG. 6, wherein each key of a telephone keypad can be associated with an adjacent second key. Thus, In FIG. 6, the key 60 is associated with a smaller "satellite" key 61, with the system operating as follows: By pressing key 60, the system will dial out the digit "2" once in the ordinary fashion. If instead key 61 is pressed, the balance of the remaining digits in the incomplete phone number will be filled and dialed out as "2's". Again, in an otherwise conventional telephone, the depression of the satellite key 61 could cause the digit "2" to be dialed out multiple times without counting the total number of digits dialed. In a cellular or other store & forward system, the depression of key 61 would cause the proper number of digits to be filled in as exemplified according to the techniques shown and taught in regard to FIG. 3.

One can, of course, utilize a typical "MOM-OFF-MOM" or other two-position momentary rocker switch for all digit keys in a similar fashion, wherein for instance an actuation in the lefthand direction would dial-out the digit indicated on the face of the key, while a righthand actuation would cause dialing-out of the digit either multiple times, or as many times as necessary to complete a valid telephone number. This is, of course, an obvious modification of abbreviated dialing utilizing multiple keys.

Another approach that can be implemented to effect multiple digit dial-out on a single keystroke is to provide one or more dedicated keys as is detailed later in the specification.

A number of these alternate embodiments are shown in the ensuing pages, any one of which may be utilized to implement the concepts and methods disclosed in the invention.

Similarly, as previously indicated with regard to the SEND key, the digit keys can also be custom configured as two-position switching keys. An example of this type is shown in FIG. 11 in connection with the SEND key, and is equally adaptable for use as a two-position switching digit-key.

TWO-POSITION DIGIT-KEYS

Telephone numbers Ending with Zeroes

In this embodiment, each individual digit-key has a second position. If the second position is actuated, it commands the system logic to finish all the remaining un-dialed digits in the phone number with zeroes. As an example, in the case of a phone number 664-5000, the digit-key 5 would be actuated into its second position, causing the system to dial the digit 5 normally, followed by three zeroes to finish the balance of the seven digit number.

It is well to note that the user did not need to make any use of the zero digit-key. The dial-out of the finishing three zeroes was effected solely by prescribed actuation of other keys (in this instance, the digit key "5").

The automatic dial-out of the digit 0 at the end of a phone number as illustrated above would take place upon the prescribed key actuation regardless of the number of zeroes needed to complete the valid telephone number.

It is well to bear in mind that the system's automatic digit dial-out, in order to finish any particular phone number, is always comprised of the same digit regardless of the number of digits required to complete the valid telephone number. Specifically, in the example above, that digit was the digit zero dialed three times in succession by the system.

Other Repeat Finishing Digits

Another illustration of a phone number would be an actual phone number for toll-free placing of mail orders, i.e. 800-344-4444. Utilizing the teachings of the invention the user would not have to manually actuate the finishing digit 4 key six times in succession. The user would merely actuate the "4" key in a prescribed manner, prompting the system to automatically dial-out the digit "4" six times in succession to complete the valid telephone number.

One example of a prescribed actuation technique is to have the user depress the digit key associated with the repeated finishing digit ("4" in the example) into its second physical key position twice in succession. This would cause the dial-out of the digit "4" the necessary six times.

Another prescribed actuation technique that could be used is to maintain the digit-key actuated in its second position for an interval until a release tone is sounded by the system.

ROCKER SWITCH DIGIT-KEYS

Refer to FIG. 12.

The following prescribed key actuations would effect the dialing-out of digits as indicated below:

a) Momentary actuation in the lefthand direction dials-out the digit associated with that key.

b) Momentary actuation in the righthand direction dials-out the digit associated with that key, followed by as many automatically dialed 0's as are necessary to complete a valid telephone number.

c) Momentary actuation in the righthand direction twice in succession within a prescribed interval dials out the digit associated with the actuated key as many times as is necessary to complete a valid telephone number.

USE OF SATELLITE KEYS

Figure 13:
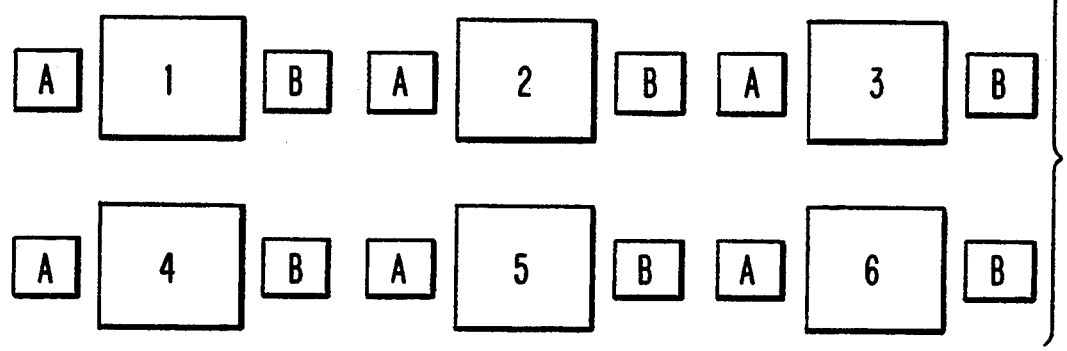
FIG. 13 is a diagram of a keypad according to this invention having two adjacent satellite keys for each main digit key.
Figure 14:
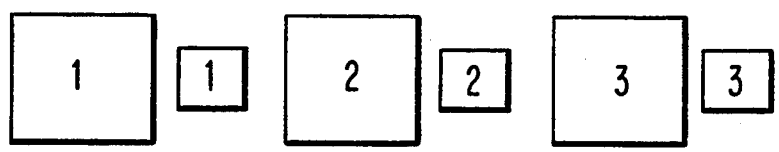
FIG. 14 is a diagram of a keypad according to this invention having one adjacent satellite key for each main digit key.
Figure 15:
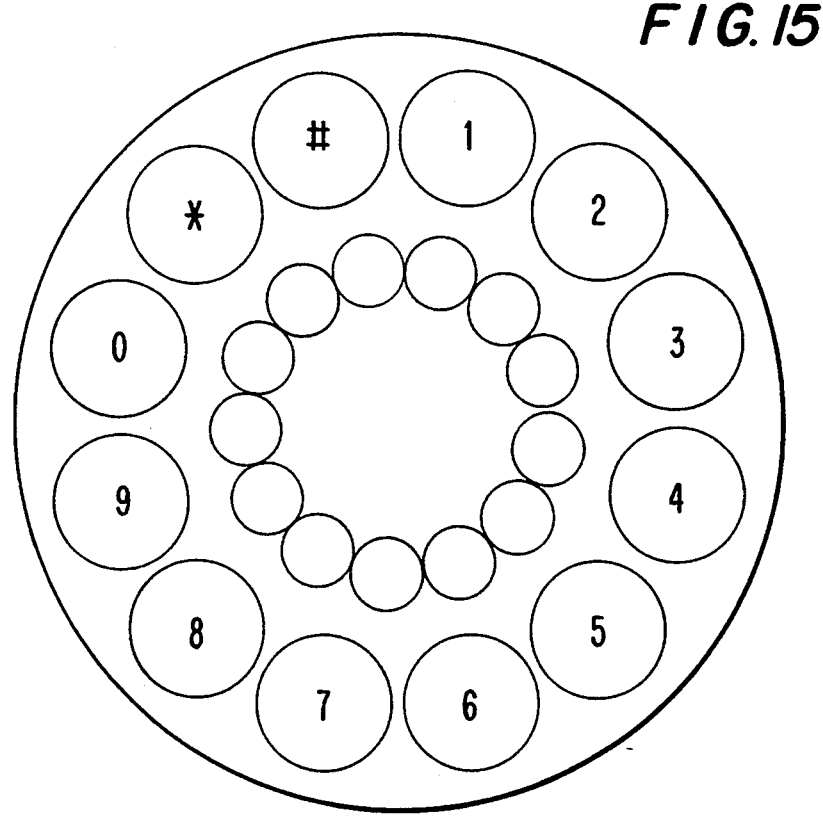
FIG. 15 is a diagram of a circular keypad according to this invention having one adjacent satellite key for each main digit key.

Refer to FIG. 13, 14 and 15.

Actuation of satellite key A shown in FIG. 13 effects automatic digit dial-out as follows:
i) Dial-out of the digit associated with the adjacent main key;
ii) followed by automatic dialing-out of the digit "0" as many times as is necessary to complete a valid telephone number.

The execution of the above with respect to satellite key A can be illustrated with the phone number "436-2000" and reference to FIG. 13. Upon momentary actuation of satellite key A, the following dial-out sequence is effected:
i) first the dial-out of the digit "2";
11) then the dial-out of the digit "0" three times in automatic succession to complete a seven-digit valid telephone number. Alternately, the execution of the above with respect to satellite key B can be illustrated with the phone number "344-4444" and reference to FIG. 13. Upon momentary actuation of satellite key B, the following dial-out sequence is effected:
i) Automatic dial-out of the digit "4" associated with the adjacent main "4" key six times in succession to complete a seven-digit valid telephone number.

It is readily apparent that this approach (the use of satellite keys associated with each main digit key) is applicable to all types of phones and dialing devices, including direct dial devices such as conventional phones and keyphones, as well as store-forward devices such as fax and cellular phones.

DEDICATED KEYS

We will now proceed to describe another method in accordance with the invention by which a user can effect multiple digit dial-outs using single keystrokes. This method utilizes one or more dedicated keys to implement the stated objective.

Figure 21:
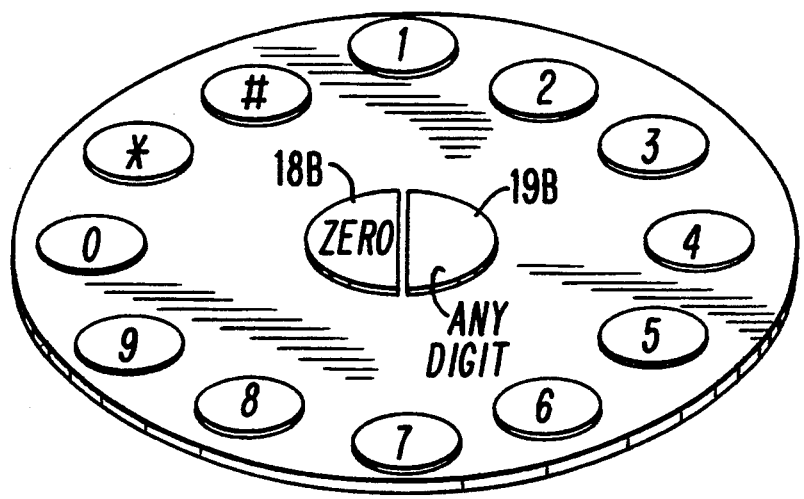
FIG. 21 is a diagram of a circular keypad according to this invention having one dedicated Finish Zero (FZ) key and one dedicated Finish Digit (FFD) key.

FIG. 21 illustrates a configuration using a telephone keypad of a circular design. This design offers the advantage that since the dedicated keys are located in the center of the keypad, they are conveniently accessible from all of the digit keys. In this configuration the key designated 18B serves as the Finish Zero key (FZK), and the key designated 19B serves as the Final Finish Digit (FFD) key. These keys are functionally equivalent to keys 19 and 18 respectively of FIG. 1.

TWO DEDICATED FINISHING KEYS

Figure 16:
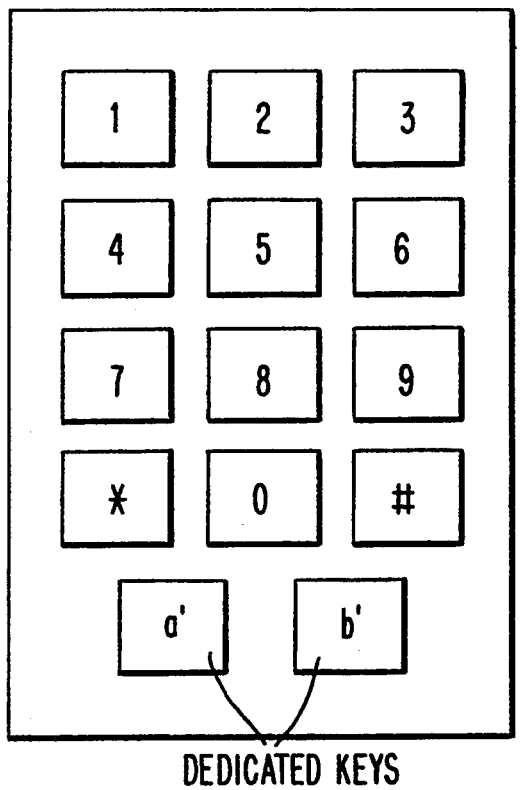
FIG. 16 is a diagram of a keypad according to this invention having two dedicated keys.

Refer to FIG. 16.

A single keystroke actuation of the "AA" key effects the multiple dial-out of the digit "0" as many times as may be required to constitute a valid telephone number.

A single keystroke actuation of the "BB" key effects the multiple dial-out of the particular digit associated with the digit key last actuated on the standard keypad, preceding the actuation of the dedicated key B', as many times as may be required to constitute a valid telephone number.

DEDICATED OVERSIZED FINISHING ZERO KEY (FZK)

Figure 17:
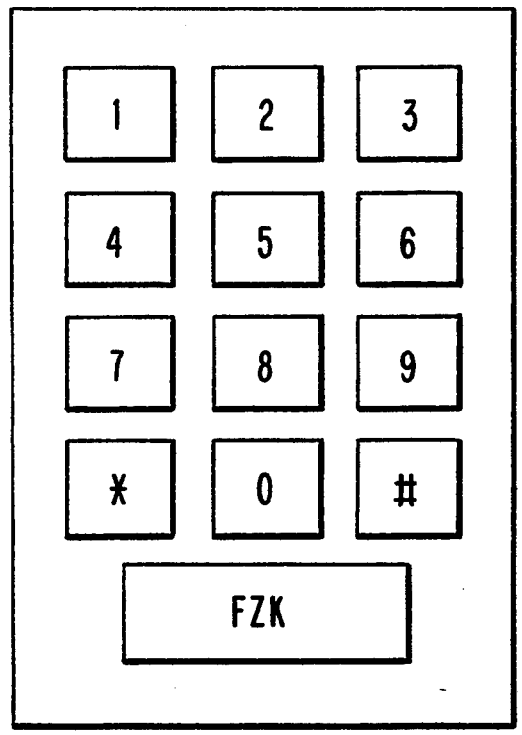
FIG. 17 is a diagram of a keypad according to this invention having one dedicated Finish Zero (FZ) key.
Figure 18:
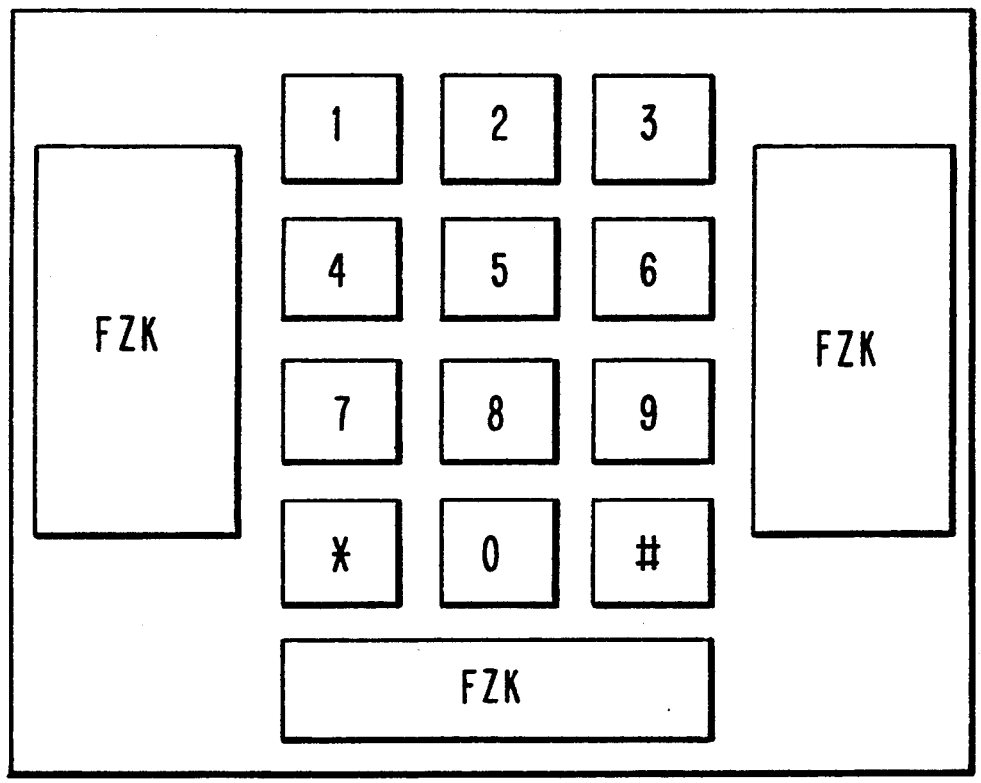
FIG. 18 is a diagram of a keypad according to this invention having three dedicated Finish Zero (FZ) keys.

Refer to FIG. 17 and 18.

Another method for treating Repeat Finishing Zeroes is to add a dedicated oversized Zero Key on the telephone keypad in addition to the standard Zero Key, preferably below the conventional Zero Key. Upon a momentary actuation of this key, the system would auto dial as many zeroes as required to constitute a valid telephone number.

ALTERNATIVE FINISHING ZERO KEY POSSIBILITIES

Figure 19:
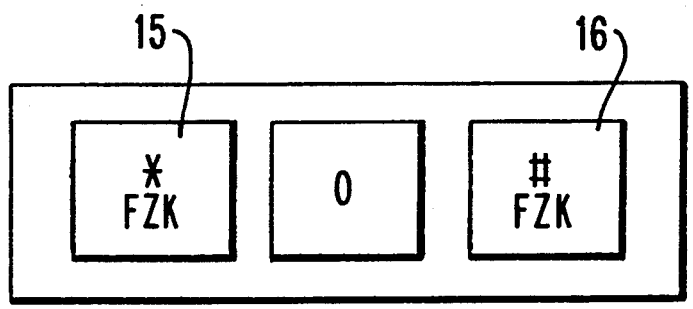
FIG. 19 is a diagram of a convention telephone keypad having star ("*") and pound ("#").

Refer to FIG. 19.

A modified approach of the additional key method that may be advantageously utilized would be to make use of existing Function Keys already situated on the keypad, such as (for example) the star ("*") or pound ("#") keys, "store" or "memory" function keys, or "recall" or "redial" type function keys. A primary or alternate activation of one of these type keys could alternatively serve the Finishing Zero or Zero functions of the invention.

USE of the ZERO KEY to EFFECT MULTIPLE ZERO DIAL-OUT

As has already been described in connection with FIG. 4, a hold-down or delayed-release protocol for the "0" key could alternatively implement the Finishing Zero functions of the invention.

Referring to FIG. 3, there is shown a typical block diagram of logic necessary to implement the automatic dial out of a finishing digit whether the digit is zero or any other digit. The dialer 30 shown in FIG. 3 is a conventional module that can be purchased from many different sources and includes a keypad as for example shown in FIG. 1 or FIG. 2. Upon dialing a number, one can distinguish between the number being a local call or a long distance call by the presence or absence of the leading access-digit "1." Hence, module 31 is coupled to the dialer to determine whether or not a "1" has been dialed as a first digit. If this is true, the system knows to expect ten more digits, and otherwise expects a seven digit local call. The number of digits is monitored by counter 32, which counts the dialed digits.

Another module or register, 33, stores the last digit dialed. In this manner, the counter 32 knows exactly the number of digits dialed while the last digit dialed is stored in register 33. The use of registers and counters to determine the number of dialed digits and the last digit dialed is well known in the state of the art.

As seen in FIG. 3, there is an output from the local or long-distance dialed module 31 to the subtractor 34. The subtractor 34 operates to subtract the number of digits required from the number of digits dialed. Hence, subtractor 34 receives information from the count dialed digits module 32 and further input from the local or LD module 31. This input from the local or LD module 31 tells the subtractor to subtract from 10 or from 7 depending whether it is a local or long distance call. Hence, module 32 as counting the dialed digits interfaces with the subtractor 34.

When the FFD switch as 17 or 18 (FIG. 1) is depressed, this is detected by module 35 which for example may be a flip flop or a one shot. Module 35 now accesses the subtractor 34, which then subtracts the actual dialed digits from the required digits. Hence, the difference which is the amount of times the last digit is to be repeated is stored in module 36 indicating the digit repeat number. The output from module 36 and the last digit dialed module 33 are directed to a last digit finish and number module 37. The function of module 37 is to respond to the last digit dialed and the number of times that this digit has to be dialed to finish the telephone number. This information is received respectively from the digit repeat module 36 which has stored therein the required number of digits needed to complete the telephone number and the last digit dialed module 33. This information is applied to the module 37. In this manner, module 37 provides at an output the digit value as for example 1-0 which is to be repeated and the number of times this digit is to be repeated as for example from 1-N. This information is clocked by means of a system clock 41 and sent to the dialer 30. In this manner, the dialer 30 automatically upon receipt of signals from the last digit finish and number module 37 causes the last digit to be dialed successively for the proper number of times to complete the number.

Also seen in FIG. 3 is the FZ or finish zero module 46. As shown in FIG. 1, when the finish zero key 19 is pressed, this indicates that a requisite number of zeros is to be transmitted by the system. In regard to the present system operation, upon depressing of the finish zero switch 19, this is recognized by module 46 which inhibits the last digit dialed module 33 and indicates to module 37 that the finishing digit is to be zero. Therefore, a zero is repeated the optimum number of times in order to complete the telephone number.

This also occurs in a cellular system when the finishing digit is "0." In the case of an incompletely keyed phone number, depression of the SEND button automatically triggers the FZ module 46, which tells the system to either repeat or end with the digit zero. In a similar manner, as will be shown, if the telephone number is to end in a digit other than zero, the system will lock for a timed depression of a particular key in order to terminate the telephone number with the proper digit as selected by the user. A timed depression of a digit key would result in an appropriate output signal on output 44 of Amp 43, as shown in FIG. 4. This output signal would be applied to module 33, thus defining the last digit keyed in.

Thus, as one can see from FIG. 3, in order to execute the abbreviated dialing procedure as described, the system must possess the following capabilities:

1. The system must monitor and count the number of manual digit entries by the user as for example the number of digits dialed.

2. The system must know whether the user is placing a local call or a long distance call.

3. The system must recognize and remember the last digit keyed in by the user.

As seen in FIG. 3, the apparatus shown operates to do this. It is also understood that there are many different ways of implementing such logic in order to accomplish the above-described results. For example, one can use a microprocessor and program the microprocessor to follow the above-described sequence.

Referring to FIG. 4, there is shown a simple schematic diagram of how a key hold-down is detected and how a release signal would be provided. As seen in FIG. 4, keys 40 may represent any one of the push button keys which are momentary contact keys as shown on a typical keypad as for example the digit keys "1" through "0" or the "*" and "#" keys. Upon depression of a key 40, a one shot 41 is automatically triggered. If the key is released, the AND gate 42 will not be activated due to the fact that the key 40 has been released. If key 40 is held down by the user then at the end of the one shot period, gate 42 is energized which sends a high signal to amplifier 43 which activates a suitable alarm device 44 indicating or informing the consumer that he can now release the button. It is also understood that in the case of a telephone keypad that if key 40 is pressed and the one shot is triggered, the depression of any other key will also cause the one shot to be reset via its reset line. Therefore, the only time that one shot 41 will time out is when key 40 is held in place and no other key is accessed by the user. This assures that the multiple utilization of key 40 during keyboard activation will not cause the alarm or the reset signal to appear.

Thus, by using the logic as shown in FIG. 4 in conjunction with the logic sequence in FIG. 3, the system can determine that a key has been held and further determine which key it is. As indicated previously, this feature can be employed in causing the system to actuate a finish digit mode in a cellular system implementation.

Pertinent to the circuit structure shown in FIG. 4, there will now be a discussion concerning a triple repeat digit. As already indicated above, a triple repeat digit (TRD) is a digit which repeats in the middle or elsewhere in a telephone number. For example, take the local number "777-0000". This telephone number has the triple repeat digits "777" with a four digit zero ending. The caller, upon dialing such a number, with first access the "7" key and then hold it down until the release tone is sounded or release is otherwise indicated by the System. In this manner, the depression of the "7" key which is the digit dialed and the hold down of the "7" key informs the system to repeat the "7" three times.

The caller will then dial a single zero in a cellular phone application, for example, or hit the finish zero key 19 to indicate to the system that zeros are needed to finish the number. Thus the system will operate to first repeat dial the digit "7" three times and then to repeat the last digit zero four times.

Figure 5:
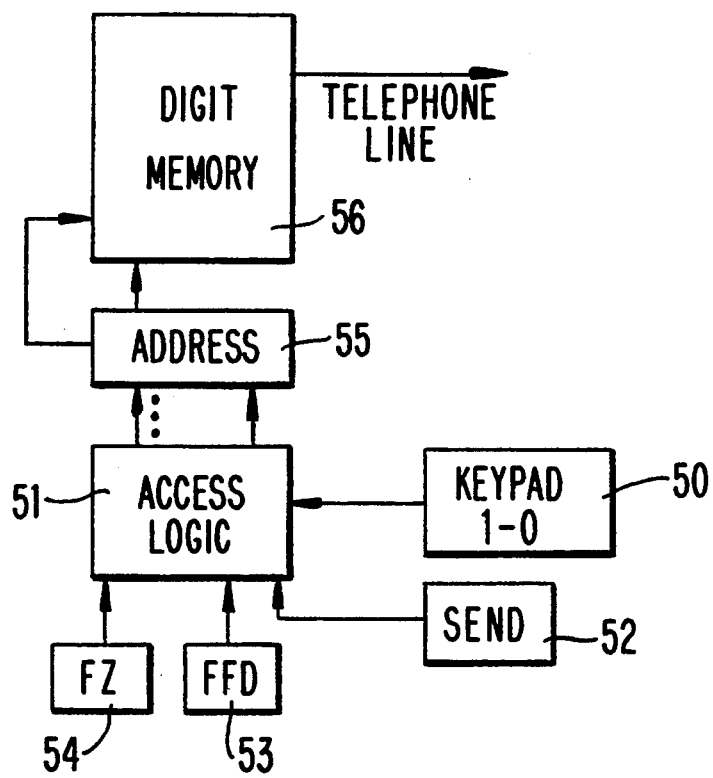
FIG. 5 is a block diagram showing an abbreviated dialing apparatus according to this invention.

Referring to FIG. 5, there is shown a schematic block diagram of a circuit module which can be implemented to interface with the keypad shown for example in FIGS. 1 and 2. It is understood that the above-described procedures for implementing abbreviated dialing utilizing a conventional telephone system or a cellular system can operate in a similar manner. As specified above, a local phone number or long distance number must both contain a certain number of digits in order to be valid. This is of utmost importance in a cellular system, where the correct number of digits must be entered for transmission. Thus, as seen in FIG. 5, there is a keypad 50 which interfaces directly with access logic 51. The access logic 51 contains logic arrangements such as a PLA, and responds to the different systems the phone associated with the circuitry is installed in. Essentially, the access logic interfaces with the SEND key 52, which would be a typical SEND key as employed in the cellular system. Another input of the access logic receives information from the finish final digit key via module 53, which finish final digit keys are the keys shown in FIG. 2, and also receives information from a finish zero or FZ key (19) associated with the keypad via module 54. The access logic interfaces with the address logic 55 associated with a digit memory 56. The digit memory 56 has a plurality of storage locations, each of which can store a telephone number digit and is associated with the keypad 50. IC components readily available and suitable to implementation of the logic as depicted in FIG. 5 are widely used and well known in the state of the art.

As indicated, in most instances an integral function of the system operation is to monitor the phone line and to count the number of digits a phone user dials out manually, thereby evaluating the number of digits still remaining to be dialed out by the system in order to constitute a completed phone number. This mode of operation is implemented especially in the cellular system where it is extremely important. However, as indicated above, in a normal telephone system, one does not have to dial out the correct remaining finishing digits as the telephone system will ignore all digits dialed after seven or ten digits have been received. In this manner, the access logic 51, when associated with a typical telephone system, will dial out an arbitrary number of finishing digits when the finish zero key or the FFD keys are activated by the user. Thus, when a user activates the finish zero key (for example, key 19 of FIG. 1), the access logic 51 will cause the digit memory 56 to dial a zero digit (for example) 5 times, even though the telephone number may have less than five digits left.

In a similar manner, the access logic 51, upon receiving an indication from the finish digit keys as keys 17 and 18 of FIG. 1, will cause the digit memory to dial out the last dialed digit similarly, i.e., five times, to which the telephone switching system will of course respond by ignoring the excess. As one can see, this is a very simple implementation to accommodate abbreviated dialing in regard to finishing digits of telephone numbers. As also seen, the logic of FIG. 5 interfaces with the SEND button as for example 52. The Access logic 51 will operate when installed in a cellular system to respond to the activation of the SEND switch and to thereby determine how many remaining digits are to be dialed in according to the logic. As indicated above, activation of the SEND key will complete the dialed number in the cellular system with a correct number of finishing zeros or a Final Finishing Digit. An example of this manner of operation is outlined above in connection with the configuration as shown in regard to FIG. 3.

As indicated, another way of finishing the telephone number with zeros or finishing the telephone number with some other digit is the utilization of a hold-down protocol. This is implemented by the user actuating a key on the keypad and holding it down until an acknowledgement is provided by the system. An example of the circuitry which may be employed for example is shown in FIG. 4. In any event, the access logic 51 responds to the above-described operation and knows when a key has been depressed for the requisite period, so the logic will inform the caller when the key can be released.

Based on this feature, the access logic 51 will know whether to finish the dialed telephone number with repetitive zeros or to finish the dialed telephone number with another repetitive digit as selected by the user. In the same manner, the holding down of a digit key and the recognition of the hold down of a digit key can cause the access logic 51 to generate three consecutive digits which three digits are not finishing digits. Repetitive digits occuring within telephone numbers can be repeated by the user by holding down the digit key to be repeated. Accordingly, one may employ this method to activate a triple repeat digit which is a digit which repeats successively three times in a telephone number. Thus, by holding down the digit key indicative of the triple digit when the digit first appears, one will now be assured that digit will be repeated three times. While a triple repeat digit is preferred, one will understand that this could be alternatively implemented for digits repeating any predetermined number of times.

VOICE RECOGNITION APPLICATIONS

Voice recognition can be very suitably applied in implementing the concepts of the invention, namely to effect multiple digit dial-out by only a single word or syllable actuation otherwise in accordance with the various embodiments of the invention as already illustrated. The method of the invention is fully suited to use in conjunction with voice-response dialing systems well known to the state of the art. In store & forward implementations of these system, a user enters the digits of the phone number to be dialed verbally by annunciating each individual digit, and upon completion annunciates a further "command word" such as "Send" or "Dial," prompting the voice-response system to dial the phone number.

In the case of a phone number having a Multiple Repeat Finishing Digit, for example, "675-5555," the user must redundantly annunciate the word "Five" five times in succession.

Further complicating this is the fact that voice-response dialing systems as currently available often exhibit inherent problems of mis-recognition. If a user's pronunciation or annunciation of an instruction is not precise (for example, from the nasality of a stuffy nose), or in atmospheres with a high or changing level of ambient noise (for a cellular example, from the auto air-conditioner being on or from a noisy truck passing by), the voice-response system may misinterpret digits, and if not corrected will dial the wrong number.

These factors tend to make the current state of voice-dialing difficult and tedious, and it follows that any reduction in the total annunciations necessary to complete and dial a number would be markedly beneficial, and would represent a substantial enhancement to the state of the art. The method of the instant invention contemplates and provides the wherewith to accomplish such reduction in a manner fully analogous to and functionally compatible with the invention as implemented with a keypad.

The user would annunciate a prescribed (or pre-programmed) "command word" associated with the desired function of the invention, which would be substantially concurrent with the appropriate key actuation or keypad protocol. To wit, such commands certainly might be conceptulized as "verbal keystrokes."

A simplified example of a set of "command words" and their analogous functions that might embody this on a cellular phone might be:

"Zero" through "Nine": Analogous to momentarily pressing the ordinary digit of the same name.

"Send": Analogous to pressing the SEND key.

"Finish": Analogous to the key or keypad protocol producing a send with RFD.

"Zip": Analogous to the key or keypad protocol producing a send with RFZ.

"Repeat": Analogous to the key or keypad protocol producing TRD.

Using such a construct, the number "777-0000," for instance, could be dialed aloud according to the invention by speaking the sentence: "Seven, Repeat, Zip." Similarly, the number "675-5555" could be dialed aloud by speaking the sentence: "Six, Seven, Five, Finish," and the number "333-4441" could be dialed aloud by speaking the sentence: "Three, Repeat, Four, Repeat, One, Send."

Alternatively (and again completely analogous to keypad protocols discussed previously), it would also be straightforward enough to eliminate either "Zip" or "Finish" from the above command-set by having "Send" perform the function whenever the digits previously entered do not form a complete telephone number.

Likewise, since it is possible for practically any key or protocol to be duplicated or replaced by a voice command, it should also be noted that many sorts of mixed voice/keypad systems could be created, including complete systems where each key and keypad protocol would possess a voice analog performing the identical unction, or "hybridized" systems where some functions might be voice-only, some might be keypad-only, and/or some might be both. The principle is the same; that for such purposes a keystroke is a keystroke, whether it is performed verbally, mechanically, or otherwise.

It should of course be understood that the command word set cited above is illustrative only, and should not be construed as complete or limiting in any way. Any other words or phrases might as easily be programmed or pre-programmed into a voice-recognizing device according to the invention, thereby effecting verbally controlled operations that are functionally analogous to the invention as implemented with a keypad.

It is abundantly evident from all of the above that the inclusion of the method of the instant invention as part of voice-response dialing systems would constitute a welcome advancement and a valuable improvement to the state of the art of voice-recognition dialing. Such an improvement would be especially beneficial in the cellular/mobile environment, where, in addition to the convenience benefits there are vehicular safety considerations. It is of course understood that in addition to the cellular application, the benefits described are as well relevant to voice-response dialing systems used in conjunction with telephones and dialers of any other kind.

MEMORY-SYSTEM PROGRAMMING APPLICATIONS

Like voice dialing, another area where the concepts of the invention can be very suitably applied is in the programming of traditional "memory" keys, namely by effecting multiple digit programming entry by only a single keystroke actuation otherwise in accordance with the various embodiments of the invention as already illustrated. Such memory-systems typically require the entry of a telephone number via some sort of "memory-storage" protocol that associates the entered number with one or more dedicated storage locations to be accessed later through a separate "memory-recall" protocol. The method of the invention is fully suited to use in conjunction with any system that requires entry of a telephone number for purposes of storage for later recall and use, since such number-entry for purposes of storage is not fundamentally different from number-entry for purposes of dialing. There is, in fact, substantial analogy between the way most of these systems work and the way a store & forward dialing system works; i.e., in a memory-system one enters the number into a temporary "buffer" memory and forwards it into a recallable "permanent" memory using some sort of "MEMORY" key or protocol, whereas in a store & forward dialing system one similarly enters the number into a temporary "burlier" memory and forwards it to the telephone line using some sort of "SEND" key or protocol. The distinction between temporary "buffer" memories and recallable "permanent" memories is a matter of function and not hardware, and can largely be defined according to whether the memory in question is explicitly intended for programming and use by the user rather than the system; i.e., in the above examples the contents of a store & forward "buffer" are changed by the system whenever a new phone number is dialed, making its use general to the system and primarily transparent to the user, who has no option but to enter data into the system through it and no option to preserve its contents once new data has been entered. In contrast, in a "permanent" memory the contents are changed only by a specific user protocol and are never altered by the system except when specifically and selectively requested by the user.

For an example, let us assume a ten location memory-system (0–9) using a single dedicated "MEMORY" key and using the protocol: "MEMORY" <memory number 0–9> <telephone number> "MEMORY" for storing numbers. To store the number "777-5555" into memory location 4, one would enter the sequence: "MEMORY" "4" "7775555" "MEMORY," with each individual digit being entered singly. Under the teachings of the invention as previously illustrated, one might stead postulate the same device additionally using a digit-key hold-down protocol for accomplishing TRD and a dedicated "RFD" key for repeat finishing digits, so one might instead enter the sequence: "MEMORY" "4" "7" <and hold> "5" "RFD" "MEMORY," saving four (36%) of the original eleven keys.

The dedicated RFD key in the above example could as easily function to produce RFZ, and likewise the "MEMORY" key in such an application could function analogously to the "SEND" key in a store & forward embodiment, doing either RFD or RFZ and filling in any missing digits automatically. The example above, assuming the "MEMORY" key instead of a dedicated key was serving to effect RFD, would then become: "MEMORY" "4" "7" <and hold> "5" "MEMORY," saving one extra keypress.

Note also that in software systems where key-codes rather than whole digits are used to store phone numbers in memory, this method is highly RAM-conservative and might be employed usefully on a software level in RAM-critical applications.

In any event, one can readily see that any device incorporating memory storage for dialing purposes which tell upon entry of memory numbers in a standard dialing format could also incorporate the teachings of the invention for purposes of memory entry.

OTHER APPLICATIONS INCLUDING EXTERNAL CALL-HANDLING EQUIPMENT

This patent addresses and is directed to all forms of telephone dialing means and equipment, as well as keypads incorporated in various forms in a multitude of telephone-associated equipment.

The following specifics are not intended to be limiting, but only serve to cite specific examples of various telephone and telephone-associated equipment which are presently in widespread use and which incorporate some telephone dialing means. Such equipment includes various telephone dialers, telephone instruments and subsets, including, for example, cordless and portable telephones, cellular and mobile telephones, fax machines, and public pay-phones.

It should be noted here that the teachings of the invention, in whole or in part, could be easily effected by various hardware and software means on many types of call-handling equipment external to the actual telephone or device being used to place the call; e.g. KSU's, PBX's, or even in telephone carrier central-office systems. This equipment could be programmed with various protocols to respond to User Actuations of the various Illustrated Keys; e.g., Digit Keys, Dedicated Keys, and/or SEND Keys, to effect automatic multiple-digit dial-out as required for the completion of a valid telephone number.

It should also be mentioned that all of the various configurations, embodiments, and methods of the invention described are, as well, contemplated to be used with and incorporated into Stand-Alone Dialers and Dialer/Keypads of all types, and likewise to be used with and incorporated into various telephone gear of all kinds, whether it be cellular phones, mobile phones, key phones, etc., to cite some likely examples. It is of course strictly understood that the claims appended hereto will cover the intent and scope of the present invention, but it is clearly indicated that all of the claims apply as well to fax machines, which are of course connected to telephone lines and have means for dialing telephone numbers, and which incorporate a "SEND" type key feature as part of a "store & forward" dialing format. Hence, the abbreviated dialing apparatus as described is applicable to telecopier machines which are in widespread use and which would also receive great advantages from the use of the present invention.

Finally, note that in non-store/forward applications the invention would be of substantial benefit to the telephone companies themselves, since any device that shortens the duration of an average dialing sequence will result in less tie-up time for the telco's very expensive capital equipment. Even a small savings per call could result in billions of seconds of equipment up-time saved annually.

It can be readily appreciated that there are many ways of implementing the above-described operations and functions of the invention, including the implementation of triple-repeat digits, a predetermined number of digits (finishing or otherwise), or the exact number of finishing digits necessary to form valid telephone numbers. With suitable structure, there is no limit on how the invention can be implemented or on the hardware and/or software permutations that could be used to implement it. For example, as indicated earlier, one can employ a voice-responsive system whereby a "keyword" becomes completely analogous to a "keystroke" or a "keypad protocol" for effecting various types of abbreviated dialing according to the invention.

One skilled in the art will immediately understand that there are many, probably thousands, of ways in which the teachings of this invention could be implemented in various devices with various aims. All such ways are deemed to be within the spirit and scope of the claims appended to this specification.

What I claim is:

1. Apparatus for enabling abbreviated telephone dialing in a dialing system when dialing a telephone number having a repetitive finishing digit, said apparatus including at least one means responsive to a prescribed actuation, the apparatus comprising:

first means operative to detect the dialing of a long distance or local telephone number and to output such first information, second means operative to count the digits dialed and to output such second information, dialing means responsive to said first and second informations and said prescribed actuation to cause the completion of said telephone number as a valid telephone number by repetition of said finishing digit, and wherein said apparatus further includes voice recognition means and wherein said prescribed actuation is the enunciation of a prescribed command word or words.

2. Apparatus for enabling abbreviated telephone dialing in a dialing system upon a calling party dialing a telephone number having a number of repetitive digits appearing sequentially in said number, said apparatus including digit entry means and dialing means, said digit entry means including at least voice responsive means being responsive to at least vocal digit and select command word entries, vocal actuation of said responsive means effecting the dial out of any given entered digit, said calling party dialing said telephone number via said digit entry means until the first one of said repetitive digits is entered, said voice responsive means being responsive to a prescribed actuation by said calling party, wherein said prescribed actuation is comprised of an enunciation of a prescribed command word or words, the apparatus comprising:

last digit dialed storage means, said storage means storing the last digit dialed by said calling party, and wherein said voice responsive means responsive to said prescribed actuation and in operative cooperation with said storage means outputting a control signal to said dialing means thereby initiating an automatic repeat dial operation, wherein said dialing means effects the repeat dialing of the last digit stored in said storage means a number of times without further actuation of said responsive means.

3. In a dialing system in accordance with claim 2, wherein upon said prescribed actuation, said last digit stored is consistantly repeatedly dialed a given predetermined number of times.

* * * * *